(12) United States Patent
Chan

(10) Patent No.: US 11,349,389 B2
(45) Date of Patent: May 31, 2022

(54) BOOST CONVERTER WITH HIGH POWER FACTOR

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/204,092

(22) Filed: Mar. 17, 2021

(65) Prior Publication Data

US 2022/0029528 A1 Jan. 27, 2022

(30) Foreign Application Priority Data

Jul. 23, 2020 (TW) .................................. 109124907

(51) Int. Cl.
  *H02M 1/42* (2007.01)
  *H02M 3/158* (2006.01)

(52) U.S. Cl.
  CPC ....... *H02M 1/4225* (2013.01); *H02M 1/4266* (2013.01); *H02M 3/1588* (2013.01)

(58) Field of Classification Search
  CPC .... H02M 1/42; H02M 1/4208; H02M 1/4225; H02M 1/4266; H02M 3/156; H02M 3/158; H02M 3/1588
  See application file for complete search history.

(56) References Cited

U.S. PATENT DOCUMENTS

| | | | | |
|---|---|---|---|---|
| 8,824,181 B2* | 9/2014 | Choi | ..................... | H02M 3/335 363/89 |
| 2009/0161395 A1* | 6/2009 | Hua | .................. | H02M 3/33507 363/89 |
| 2014/0078798 A1* | 3/2014 | Turchi | .................... | H02M 1/42 363/89 |

* cited by examiner

*Primary Examiner* — Gary L Laxton
(74) *Attorney, Agent, or Firm* — McClure, Qualey & Rodack, LLP

(57) ABSTRACT

A boost converter with high power factor includes a bridge rectifier, a divider and filter circuit, a capacitive adjustment circuit, an induction circuit, a multiplier, a power switch element, a PWM (Pulse Width Modulation) IC (Integrated Circuit), an output stage circuit, and a feedback circuit. The bridge rectifier generates a rectified voltage according to a first input voltage and a second input voltage. The divider and filter circuit generates a divided voltage according to the rectified voltage. The output stage circuit generates an output voltage. The feedback circuit generates a feedback voltage according to the output voltage. The multiplier generates a product voltage difference according to the divided voltage and the feedback voltage. The capacitive adjustment circuit is enabled or disabled according to the feedback voltage. The induction circuit selectively provides a compensation current according to the product voltage difference.

15 Claims, 5 Drawing Sheets

BOOST CONVERTER WITH HIGH POWER FACTOR

CROSS REFERENCE TO RELATED APPLICATIONS

This application claims priority of Taiwan Patent Application No. 109124907 filed on Jul. 23, 2020, the entirety of which is incorporated by reference herein.

BACKGROUND OF THE INVENTION

Field of the Invention

The disclosure generally relates to a boost converter, and more specifically, to a boost converter with high power factor.

Description of the Related Art

In conventional designs, if a boost converter supplies electric power to a load, the total capacitance will be equal to the sum of the boost converter's capacitance and the load's capacitance. However, if the total capacitance is too high, the power factor of the boost converter may be affected, and the conversion efficiency of the boost converter may be reduced. Accordingly, there is a need to propose a novel solution for solving the problems of the prior art.

BRIEF SUMMARY OF THE INVENTION

In a preferred embodiment, the invention is directed to a boost converter with high power factor. The boost converter includes a bridge rectifier, a divider and filter circuit, a capacitive adjustment circuit, an induction circuit, a power switch element, a PWM (Pulse Width Modulation) IC (Integrated Circuit), an output stage circuit, a feedback circuit, and a multiplier. The bridge rectifier generates a rectified voltage according to a first input voltage and a second input voltage. The divider and filter circuit generates a divided voltage according to the rectified voltage. The induction circuit is coupled through the capacitive adjustment circuit to the bridge rectifier. The power switch element selectively couples the induction circuit to a ground voltage according to a PWM voltage. The PWM IC generates the PWM voltage. The output stage circuit is coupled to the induction circuit, and is configured to generate an output voltage. The feedback circuit generates a feedback voltage according to the output voltage. The feedback circuit includes a linear optical coupler. The multiplier generates a product voltage difference according to the divided voltage and the feedback voltage. The capacitive adjustment circuit is selectively enabled or disabled according to the feedback voltage. The induction circuit selectively provides a compensation current according to the product voltage difference.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows:

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
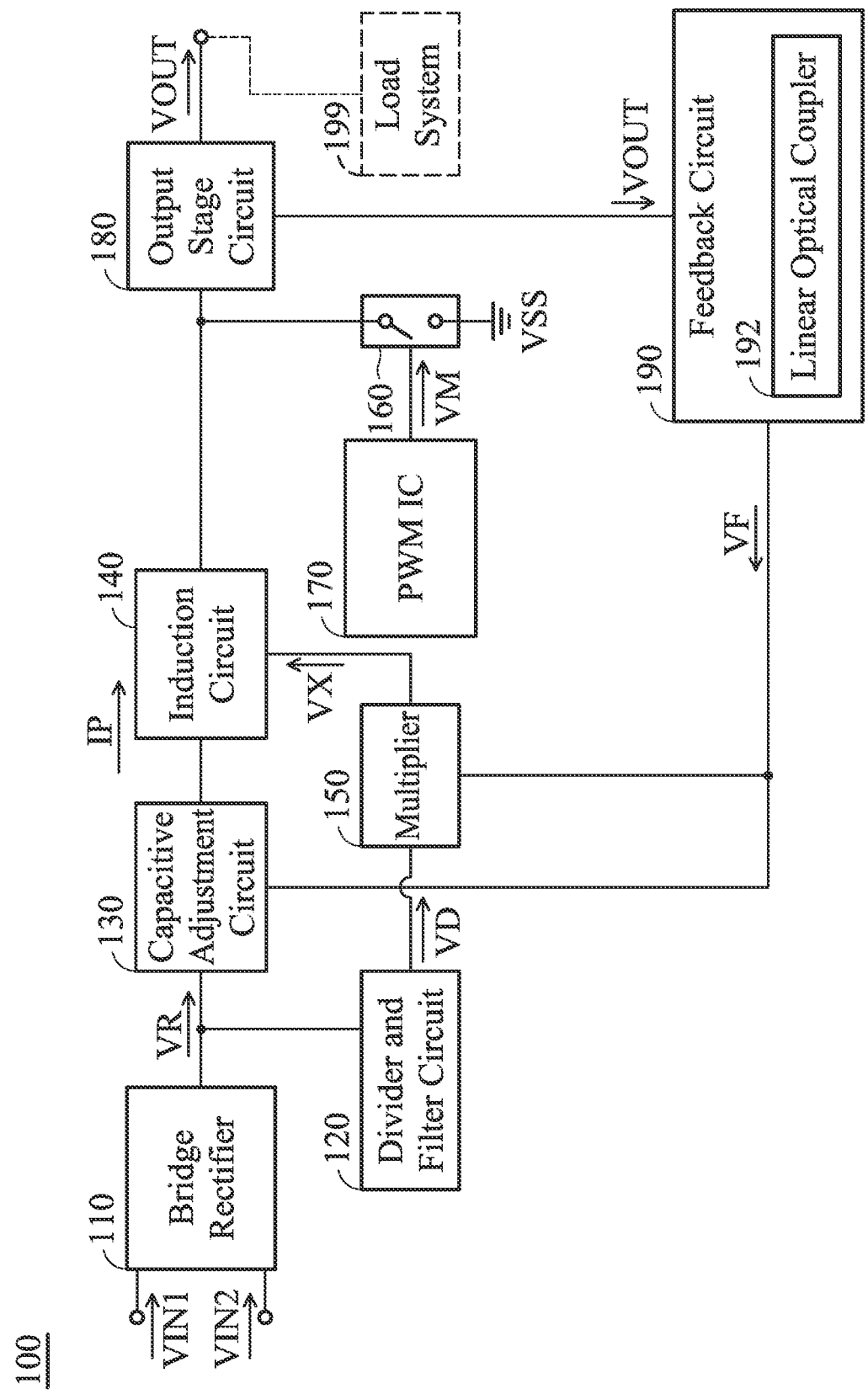
FIG. 1 is a diagram of a boost converter according to an embodiment of the invention.

FIG. 1 is a diagram of a boost converter 100 according to an embodiment of the invention. For example, the boost converter 100 may be applied to a desktop computer, a notebook computer, or an all-in-one computer. As shown in FIG. 1, the boost converter 100 includes a bridge rectifier 110, a divider and filter circuit 120, a capacitive adjustment circuit 130, an induction circuit 140, a multiplier 150, a power switch element 160, a PWM (Pulse Width Modulation) IC (Integrated Circuit) 170, an output stage circuit 180, and a feedback circuit 190. The boost converter 100 can supply electric power to a load system 199, which is not an internal component of the boost converter 100. It should be noted that the boost converter 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. The first input voltage VIN1 and the second input voltage VIN2 may be from an external input power source. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be from about 90V to 264V, but they are not limited thereto. The divider and filter circuit 120 generates a divided voltage VD according to the rectified voltage VR. The induction circuit 140 is coupled through the capacitive adjustment circuit 130 to the bridge rectifier 110. The capacitive adjustment circuit 130 is configured to control the capacitive characteristic of the boost converter 100. The power switch element 160 can selectively couple the induction circuit 140 to a ground voltage VSS (e.g., 0V) according to a PWM voltage VM. For example, if the PWM voltage VM has a high logic level (e.g., a logic "1"), the power switch element 160 will couple the induction circuit 140 to the ground voltage VSS (e.g., the power switch element 160 is similar to a short-circuited path). Conversely, if the PWM voltage VM has a low logic level (e.g., a logic "0"), the power switch element 160 will not couple the induction circuit 140 to the ground voltage VSS (e.g., the power switch element 160 is similar to an open-circuited path). The PWM IC 170 generates the PWM voltage VM. The output stage circuit 180 is coupled to the induction circuit 140, and is configured to generate an output voltage VOUT. For example, the output voltage VOUT may be substantially a DC (Direct Current) voltage, whose voltage level may be about 400V, but it is not limited thereto. The feedback circuit 190 includes a linear optical coupler 192. The feedback circuit 190 generates a feedback voltage VF according to the output voltage VOUT. The capacitive adjustment circuit 130 is selectively enabled or disabled according to the feedback voltage VF. For example, if the feedback voltage VF has a high logic level, the capacitive adjustment circuit 130 may be enabled. Conversely, if the feedback voltage VF has a low logic level, the capacitive adjustment circuit 130 may be disabled. The multiplier 150 generates a product voltage difference VX according to the divided voltage VD and the feedback voltage VF. The induction circuit 140 can selectively provide a compensation current IP according to the product voltage difference VX. With such a design, when the load system 199 is coupled to the boost converter 100, the capacitive adjustment circuit 130 can be enabled to reduce the total capacitance of the boost converter 100 and the load system 199, and the induction circuit 140 can generate the compensation current IP to suppress the harmonic distortion of the boost converter 100. Therefore, the additional capacitive characteristic of the load system 199 is effectively suppressed, and the power factor of the boost converter 100 is significantly increased.

The following embodiments will introduce the detailed structure and operation of the boost converter 100. It should be understood these figures and descriptions are merely exemplary, rather than limitations of the invention.

Figure 2:
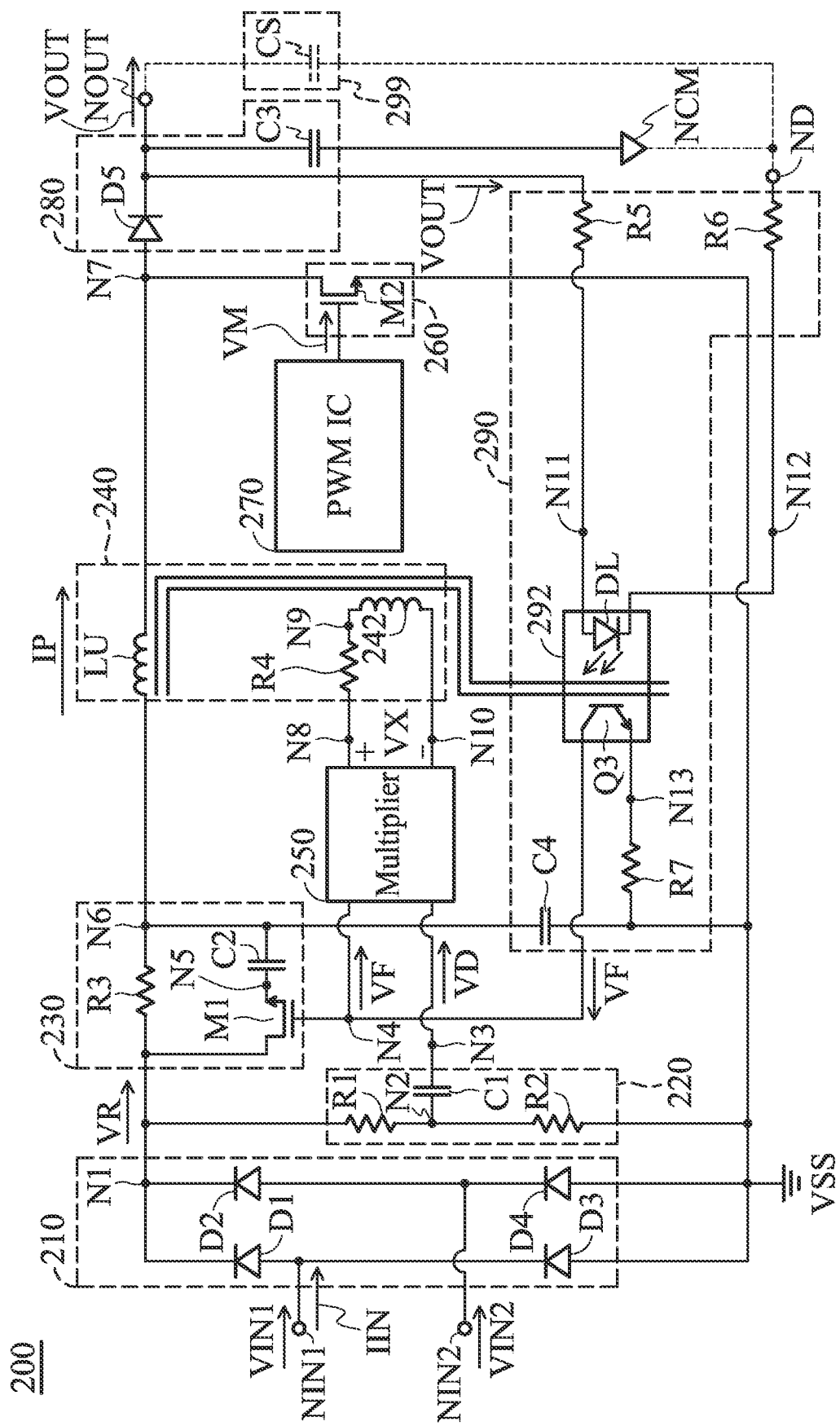
FIG. 2 is a diagram of a boost converter according to an embodiment of the invention.

FIG. 2 is a diagram of a boost converter 200 according to an embodiment of the invention. In the embodiment of FIG. 2, the boost converter 200 with a first input node NIN1, a second input node NIN2 and an output node NOUT includes a bridge rectifier 210, a divider and filter circuit 220, a capacitive adjustment circuit 230, an induction circuit 240, a multiplier 250, a power switch element 260, a PWM IC 270, an output stage circuit 280, and a feedback circuit 290. The first input node NIN1 and the second input node NIN2 of the boost converter 200 are arranged for receiving a first input voltage VIN1 and a second input voltage VIN2 from an external input power source, respectively. The output node NOUT of the boost converter 200 is arranged for outputting an output voltage VOUT to a load system 299, which is not an internal component of the boost converter 200.

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to a ground voltage VSS, and a cathode coupled to the first input node NIN1. The fourth diode D4 has an anode coupled to the ground voltage VSS, and a cathode coupled to the second input node NIN2.

The divider and filter circuit 220 includes a first resistor R1, a second resistor R2, and a first capacitor C1. The first resistor R1 has a first terminal coupled to the first node N1 for receiving the rectified voltage VR, and a second terminal coupled to a second node N2. The second resistor R2 has a first terminal coupled to the second node N2, and a second terminal coupled to the ground voltage VSS. The first capacitor C1 has a first terminal coupled to the second node N2, and a second terminal coupled to a third node N3 for outputting a divided voltage VD. It should be noted that the first capacitor C1 is configured to remove the high-frequency noise of the divided voltage VD.

The capacitive adjustment circuit 230 includes a first transistor M1, a third resistor R3, and a second capacitor C2. For example, the first transistor M1 may be an NMOS transistor (N-type Metal Oxide Semiconductor Field Effect Transistor). The first transistor M1 has a control terminal (e.g., a gate) coupled to a fourth node N4 for receiving a feedback voltage VF, a first terminal (e.g., a source) coupled to a fifth node N5, and a second terminal (e.g., a drain) coupled to the first node N1. For example, if the feedback voltage VF has a high logic level, the first transistor M1 may be enabled. Conversely, if the feedback voltage VF has a low logic level, the first transistor M1 may be disabled. The third resistor R3 has a first terminal coupled to the first node N1, and a second terminal coupled to a sixth node N6. The second capacitor C2 has a first terminal coupled to the fifth node N5, and a second terminal coupled to the sixth node N6.

The induction circuit 240 includes a boost inductor LU, a fourth resistor R4, and an auxiliary coil 242. The boost inductor LU has a first terminal coupled to the sixth node N6, and a second terminal coupled to a seventh node N7. The fourth resistor R4 has a first terminal coupled to an eighth node N8, and a second terminal coupled to a ninth node N9. The auxiliary coil 242 has a first terminal coupled to the ninth node N9, and a second terminal coupled to a tenth node N10. It should be noted that a product voltage difference VX from the multiplier 150 is applied between the eighth node N8 and the tenth node N10. Furthermore, the boost inductor LU and the auxiliary coil 242 are mutually coupled with each other, such that the boost inductor LU can generate and control a compensation current IP according to the product voltage difference VX.

The multiplier 250 has a first input terminal coupled to the fourth node N4 for receiving the feedback voltage VF, a second input terminal coupled to the third node N3 for receiving the divided voltage VD, a first output terminal coupled to the eighth node N8, and a second output terminal coupled to the tenth node N10. The product voltage difference VX may be substantially equal to the eighth node N8's voltage minus the tenth node N10's voltage. In some embodiments, the conversion function of the multiplier 250 is described according to the following equation (1).

$$VX = VF \cdot VD \qquad (1)$$

where "VX" represents the product voltage difference VX, "VF" represents the feedback voltage VF, and "VD" represents the divided voltage VD.

The power switch element 260 includes a second transistor M2. For example, the second transistor M2 may be an NMOS transistor. The second transistor M2 has a control terminal (e.g., a gate) for receiving a PWM voltage VM, a first terminal (e.g., a source) coupled to the ground voltage VSS, and a second terminal (e.g., a drain) coupled to the seventh node N7. The PWM voltage VM is configured to adjust the duty cycle of the power switch element 260. For example, if the PWM voltage VM has a high logic level, the second transistor M2 may be enabled. Conversely, if the PWM voltage VM has a low logic level, the second transistor M2 may be disabled.

The PWM IC 270 generates the PWM voltage VM. For example, when the boost converter 200 is initialized, the PWM voltage VM may be maintained at a constant voltage. When the boost converter 200 is operating normally, the PWM voltage VM can provide a periodical clock waveform.

The output stage circuit 280 includes a fifth diode D5 and a third capacitor C3. The fifth diode D5 has an anode coupled to the seventh node N7, and a cathode coupled to the output node NOUT. The third capacitor C3 has a first terminal coupled to the output node NOUT, and a second terminal coupled to a common node NCM. The common node NCM is considered as another ground node, which may be different from the ground voltage VSS.

The feedback circuit 290 includes a linear optical coupler 292, a fifth resistor R5, a sixth resistor R6, a seventh resistor R7, and a fourth capacitor C4. In some embodiments, the linear optical coupler 292 is implemented with a PC817 electronic component. The linear optical coupler 292 includes an LED (Light-Emitting Diode) DL and a BJT (Bipolar Junction Transistor) Q3. The LED DL has an anode coupled to an eleventh node N11, and a cathode coupled to a twelfth node N12. The BJT Q3 has a collector coupled to the fourth node N4 for outputting the feedback voltage VF, and an emitter coupled to a thirteenth node N13.

The fifth resistor R5 has a first terminal coupled to the eleventh node N11, and a second terminal coupled to the output node NOUT for receiving the output voltage VOUT. The sixth resistor R6 has a first terminal coupled to the twelfth node N12, and a second terminal coupled to a detection node ND. The fourth capacitor C4 has a first terminal coupled to the sixth node N6, and a second terminal coupled to the ground voltage VSS. In some embodiments, the fourth capacitor C4 is considered as an input capacitor of the boost converter 200. The seventh resistor R7 has a first terminal coupled to the ground voltage VSS, and a second terminal coupled to the thirteenth node N13.

The load system 299 can be modeled as a load capacitor CS with a first terminal and a second terminal. When the load system 299 has not been coupled to the boost converter 200, the detection node ND of the boost converter 200 is floating. At this time, the linear optical coupler 292 is turned off, and the feedback voltage VF has a low logic level for disabling the first transistor M1 and its related capacitive adjustment circuit 230.

When the load system 299 has been coupled to the boost converter 200, the first terminal of the load capacitor CS is coupled to the output node NOUT, and the second terminal of the load capacitor CS is coupled to both of the common node NCM and the detection node ND. At this time, the linear optical coupler 292 is turned on, and the feedback voltage VF has a high logic level for enabling the first transistor M1 and its related capacitive adjustment circuit 230. Therefore, the second capacitor C2 of the capacitive adjustment circuit 230 is coupled in series with the load capacitor CS of the load system 299.

Figure 3:
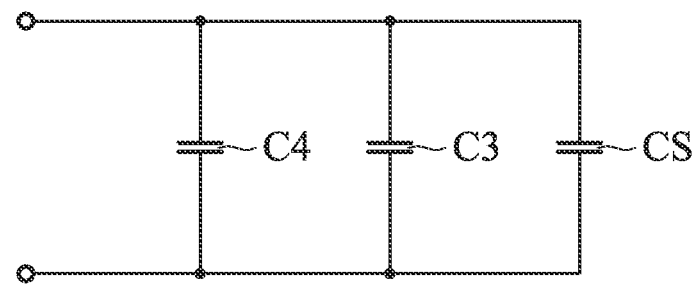
FIG. 3 is a diagram of an equivalent circuit of a conventional boost converter.

FIG. 3 is a diagram of an equivalent circuit of a conventional boost converter. As shown in FIG. 3, when the load system 299 is coupled to the conventional boost converter, its corresponding total capacitance is relatively large and described according to the following equation (2).

$$CT1 = C4 + C3 + CS \qquad (2)$$

where "CT1" represents the total capacitance of the conventional boost converter, "C3" represents the capacitance of the third capacitor C3, "C4" represents the capacitance of the fourth capacitor C4, and "CS" represents the capacitance of the load capacitor CS.

Figure 4:
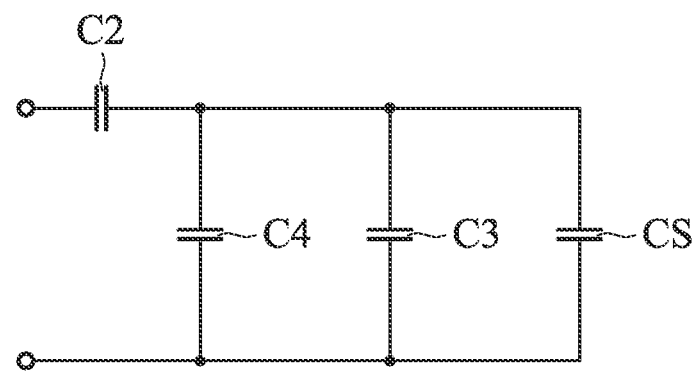
FIG. 4 is a diagram of an equivalent circuit of a boost converter according to an embodiment of the invention.

FIG. 4 is a diagram of an equivalent circuit of the boost converter 200 according to an embodiment of the invention. As shown in FIG. 4, when the load system 299 is coupled to the boost converter 200 of the invention, its corresponding total capacitance is relatively small and described according to the following equation (3).

$$CT2 = \frac{C2 \cdot (C4 + C3 + CS)}{C2 + C4 + C3 + CS} \approx C2 \qquad (3)$$

where "CT2" represents the total capacitance of the boost converter 200, "C2" represents the capacitance of the second capacitor C2, "C3" represents the capacitance of the third capacitor C3, "C4" represents the capacitance of the fourth capacitor C4, and "CS" represents the capacitance of the load capacitor CS.

It should be noted that with the design of the invention, if the capacitance of the second capacitor C2 is relatively small, the total capacitance of the boost converter 200 will approach to the capacitance of the second capacitor C2, and it is almost not affected by the load system 299. According to practical measurements, even if the load system 299 exists, the power factor of the boost converter 200 may be maintained at 0.98 or a higher value.

Figure 5:
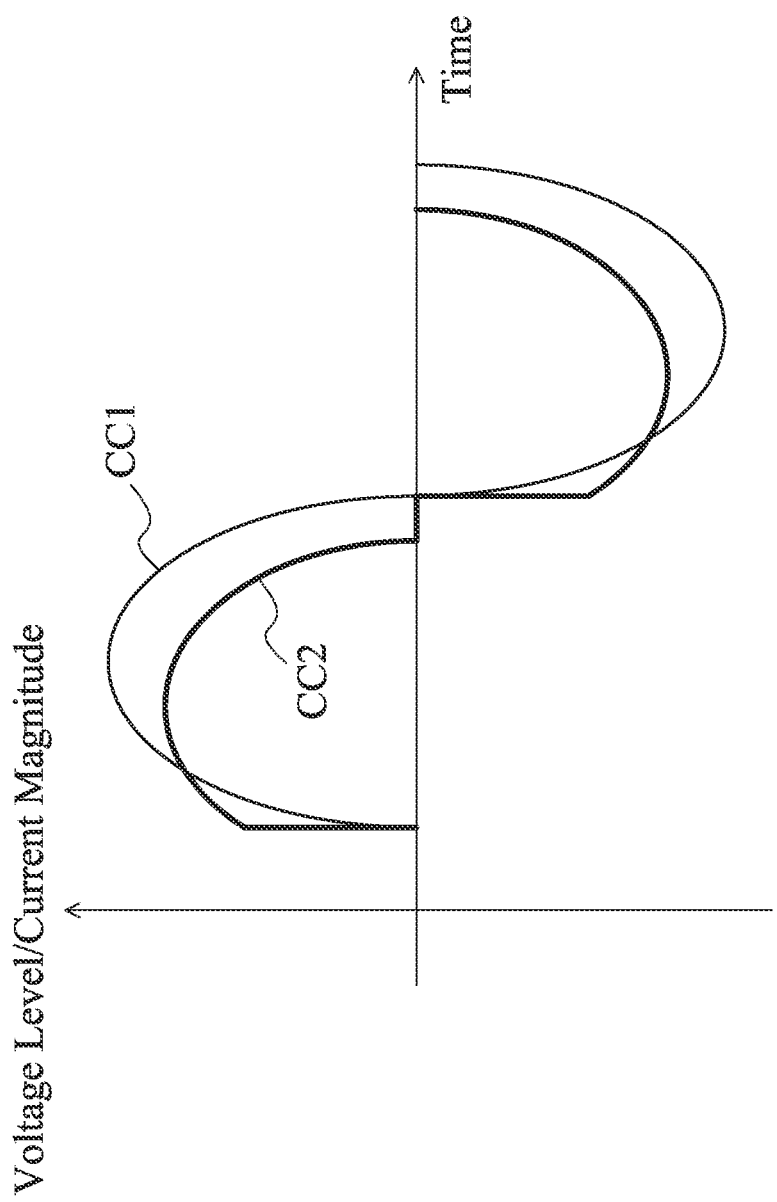
FIG. 5 is a diagram of signal waveforms of a conventional boost converter.

FIG. 5 is a diagram of signal waveforms of the conventional boost converter. A first curve CC1 represents an input voltage difference of the conventional boost converter. A second curve CC2 represents an input current of the conventional boost converter. Since the capacitive characteristic of the conventional boost converter is relatively large, the phase of the input voltage difference is much lagging that of the input current, and it often has the problem of serious harmonic distortion.

In order to solve the above problem, the boost converter 200 of the invention uses the multiplier 250 to generate the product voltage difference VX according to the feedback voltage VF and the divided voltage VD. Next, the boost inductor LU generates the compensation current IP relative to the product voltage difference VX. According to practical measurements, since the waveform of the compensation current IP is very similar to that of an input current IIN flowing through the first input node NIN1 of the boost converter 200, the incorporation of the compensation current IP can effectively suppress the harmonic distortion of the boost converter 200.

Figure 6:
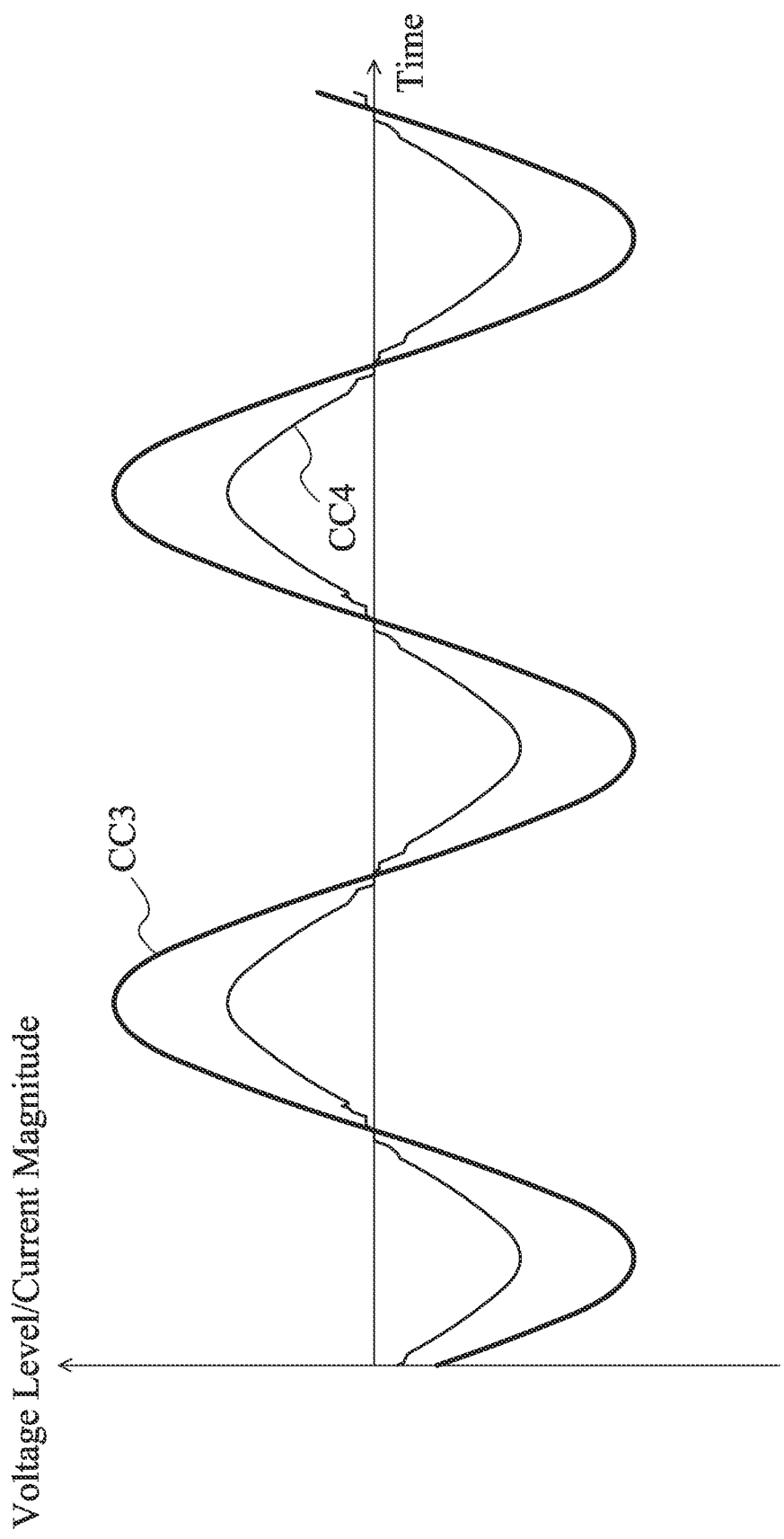
FIG. 6 is a diagram of signal waveforms of a boost converter according to an embodiment of the invention.

FIG. 6 is a diagram of signal waveforms of the boost converter 200 according to an embodiment of the invention. A third curve CC3 represents an input voltage difference (i.e., the first input voltage VIN1 minus the second input voltage VIN2) of the boost converter 200. A fourth curve CC4 represents the input current IIN of the boost converter 200. According to the measurement of FIG. 6, the input current IIN and the input voltage difference of the boost converter 200 almost have the same phases, and therefore the boost converter 200 substantially does not face the problem of harmonic distortion.

In some embodiments, the element parameters of the boost converter 200 are described as follows. The capacitance of the first capacitor C1 may be from 29.7 nF to 36.3 nF, such as 33 nF. The capacitance of the second capacitor C2 may be from 0.9 nF to 1.1 nF, such as 1 nF. The capacitance of the third capacitor C3 may be from 612 μF to 748 μF, such as 680 μF. The capacitance of the fourth capacitor C4 may be from 108 μF to 132 μF, such as 120 μF. The capacitance of the load capacitor CS is extremely high, such as about 12000 μF. The inductance of the boost inductor LU may be from 313 mH to 383 mH, such as 348 mH. The resistance of the first resistor R1 may be from 8.1 KΩ to 9.9 KΩ, such as 9 KΩ. The resistance of the second resistor R2 may be from 0.9 KΩ to 1.1 KΩ, such as 1 KΩ. The resistance of the third resistor R3 may be from 0.9 KΩ to 1.1 KΩ, such as 1 KΩ. The resistance of the fourth resistor R4 may be from 0.9 KΩ to 1.1 KΩ, such as 1 KΩ. The resistance of the fifth resistor R5 may be from 9 KΩ to 11 KΩ, such as 10 KΩ. The resistance of the sixth resistor R6 may be from 9Ω to 11Ω, such as 10Ω. The resistance of the seventh resistor R7 may be from 4.91 KΩ to 5.99 KΩ, such as 5.45 KΩ. The turn ratio of the boost inductor LU to the auxiliary coil 242 may be from 1 to 10, such as 3.125. The above ranges of parameters are calculated and obtained according to the results of many experiments, and they help to maximize the power factor of the boost converter 200 and minimize the harmonic distortion of the boost converter 200.

The invention proposes a novel boost converter, which at least includes a capacitive adjustment circuit, a multiplier, and a feedback circuit with a linear optical coupler. According to practical measurements, the boost converter using the aforementioned design is almost not affected by the capacitive characteristic of the load system, and thus the problem of harmonic distortion is solved. Therefore, it is suitable for application in a variety of devices.

Note that the above voltages, currents, resistances, inductances, capacitances and other element parameters are not limitations of the invention. A designer can adjust these settings according to different requirements. The boost converter of the invention is not limited to the configurations of FIGS. 1-6. The invention may merely include any one or more features of any one or more embodiments of FIGS. 1-6. In other words, not all of the features displayed in the figures should be implemented in the boost converter of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A boost converter with high power factor, comprising:
    a bridge rectifier, generating a rectified voltage according to a first input voltage and a second input voltage;
    a divider and filter circuit, generating a divided voltage according to the rectified voltage;
    a capacitive adjustment circuit;
    an induction circuit, coupled through the capacitive adjustment circuit to the bridge rectifier;
    a power switch element, selectively coupling the induction circuit to a ground voltage according to a PWM (Pulse Width Modulation) voltage;
    a PWM IC (Integrated Circuit), generating the PWM voltage;
    an output stage circuit, coupled to the induction circuit, and generating an output voltage;
    a feedback circuit, generating a feedback voltage according to the output voltage, wherein the feedback circuit comprises a linear optical coupler; and
    a multiplier, generating a product voltage difference according to the divided voltage and the feedback voltage;
    wherein the capacitive adjustment circuit is selectively enabled or disabled according to the feedback voltage;
    wherein the induction circuit selectively provides a compensation current according to the product voltage difference.

2. The boost converter as claimed in claim 1, wherein when a load system is coupled to the boost converter, the capacitive adjustment circuit is enabled to reduce a total capacitance of the boost converter and the load system, and the induction circuit generates the compensation current to suppress harmonic distortion of the boost converter.

3. The boost converter as claimed in claim 1, wherein the bridge rectifier comprises:
    a first diode, wherein the first diode has an anode coupled to a first input node for receiving the first input voltage, and a cathode coupled to a first node for outputting the rectified voltage;
    a second diode, wherein the second diode has an anode coupled to a second input node for receiving the second input voltage, and a cathode coupled to the first node;
    a third diode, wherein the third diode has an anode coupled to the ground voltage, and a cathode coupled to the first input node; and
    a fourth diode, wherein the fourth diode has an anode coupled to the ground voltage, and a cathode coupled to the second input node.

4. The boost converter as claimed in claim 3, wherein the divider and filter circuit comprises:
    a first resistor, wherein the first resistor has a first terminal coupled to the first node for receiving the rectified voltage, and a second terminal coupled to a second node;
    a second resistor, wherein the second resistor has a first terminal coupled to the second node, and a second terminal coupled to the ground voltage; and
    a first capacitor, wherein the first capacitor has a first terminal coupled to the second node, and a second terminal coupled to a third node for outputting the divided voltage.

5. The boost converter as claimed in claim 4, wherein the capacitive adjustment circuit comprises:
    a first transistor, wherein the first transistor has a control terminal coupled to a fourth node for receiving the feedback voltage, a first terminal coupled to a fifth node, and a second terminal coupled to the first node.

6. The boost converter as claimed in claim 5, wherein the capacitive adjustment circuit further comprises:
    a third resistor, wherein the third resistor has a first terminal coupled to the first node, and a second terminal coupled to a sixth node; and
    a second capacitor, wherein the second capacitor has a first terminal coupled to the fifth node, and a second terminal coupled to the sixth node.

7. The boost converter as claimed in claim 6, wherein the induction circuit comprises:

a boost inductor, wherein the boost inductor has a first terminal coupled to the sixth node, and a second terminal coupled to a seventh node; and a fourth resistor, wherein the fourth resistor has a first terminal coupled to an eighth node, and a second terminal coupled to a ninth node.

8. The boost converter as claimed in claim 7, wherein the induction circuit further comprises:

an auxiliary coil, wherein the auxiliary coil has a first terminal coupled to the ninth node, and a second terminal coupled to a tenth node, and wherein the product voltage difference is applied between the eighth node and the tenth node;

wherein the boost inductor and the auxiliary coil are mutually coupled with each other, such that the boost inductor generates and controls the compensation current according to the product voltage difference.

9. The boost converter as claimed in claim 8, wherein the multiplier has a first input terminal coupled to the fourth node for receiving the feedback voltage, a second input terminal coupled to the third node for receiving the divided voltage, a first output terminal coupled to the eighth node, and a second output terminal coupled to the tenth node.

10. The boost converter as claimed in claim 8, wherein the output stage circuit comprises:

a fifth diode, wherein the fifth diode has an anode coupled to the seventh node, and a cathode coupled to an output node for outputting the output voltage; and a third capacitor, wherein the third capacitor has a first terminal coupled to the output node, and a second terminal coupled to a common node.

11. The boost converter as claimed in claim 10, wherein the linear optical coupler comprises an LED (Light-Emitting Diode) and a BJT (Bipolar Junction Transistor).

12. The boost converter as claimed in claim 11, wherein the LED has an anode coupled to an eleventh node, and a cathode coupled to a twelfth node.

13. The boost converter as claimed in claim 12, wherein the BJT has a collector coupled to the fourth node for outputting the feedback voltage, and an emitter coupled to a thirteenth node.

14. The boost converter as claimed in claim 13, wherein the feedback circuit further comprises:

a fifth resistor, wherein the fifth resistor has a first terminal coupled to the eleventh node, and a second terminal coupled to the output node for receiving the output voltage; and a sixth resistor, wherein the sixth resistor has a first terminal coupled to the twelfth node, and a second terminal coupled to a detection node.

15. The boost converter as claimed in claim 14, wherein the feedback circuit further comprises:

a fourth capacitor, wherein the fourth capacitor has a first terminal coupled to the sixth node, and a second terminal coupled to the ground voltage; and a seventh resistor, wherein the seventh resistor has a first terminal coupled to the ground voltage, and a second terminal coupled to the thirteenth node.

* * * * *